United States Patent [19]

Hiruma

[11] 3,938,823
[45] Feb. 17, 1976

[54] FLUID OPERATED VEHICLE BODY LEVEL CONTROL SYSTEM

[75] Inventor: Mituo Hiruma, Kodaira, Japan

[73] Assignee: Nissan Motor Company Limited, Yokohama, Japan

[22] Filed: May 28, 1974

[21] Appl. No.: 474,066

[30] Foreign Application Priority Data
May 29, 1973   Japan............................ 48-59275

[52] U.S. Cl. ........................... 280/124 F; 267/65 D
[51] Int. Cl.² ........................................ B60G 11/28
[58] Field of Search ........ 280/124 F, 112 R, 112 A; 267/64 R, 64 A, 65 R, 65 D; 180/103

[56] References Cited
UNITED STATES PATENTS

| 3,006,656 | 10/1961 | Schaub | 280/112 A |
| 3,666,286 | 5/1972 | Engfer | 280/124 F |
| 3,683,818 | 8/1972 | Meir | 280/112 A |
| 3,747,949 | 7/1973 | Engfer | 280/124 F |
| 3,774,714 | 11/1973 | Usui | 180/103 |
| 3,799,570 | 3/1974 | Giordano | 280/124 F |
| 3,840,088 | 10/1974 | Marumo | 180/103 |

Primary Examiner—Philip Goodman
Assistant Examiner—John A. Carroll

[57] ABSTRACT

Valves impart a fluid lock on the vehicle body level adjustors when the sensed roll and/or pitch of the vehicle body exceeds a certain level to prevent delayed and erroneous compensation by the leveling system.

6 Claims, 6 Drawing Figures

FLUID OPERATED VEHICLE BODY LEVEL CONTROL SYSTEM

The present invention relates to a fluid operated leveling system of a motor vehicle body including novel means for preventing delayed and erroneous compensation by the system when the roll and/or pitch of the vehicle body exceeds a certain level.

It is well known in the prior art to provide a hydropneumatic leveling system for a body of a motor vehicle to maintain the vehicle body level with respect to the road surface or equivalently to the vehicle wheels by employing hydraulic adjustors in mechanical series with air springs at selected locations between the vehicle axles and the vehicle body. Each adjustor is communicable with a hydraulic pump and a fluid reservoir through a leveling valve, which is controlled to supply fluid into the respective adjustor from the pump or to drain fluid from the respective adjustor into the reservoir to raise or lower the vehicle body respectively at the location of the adjustor in response to a sensed lack of parallelism between the vehicle body and the road surface. Several, usually four, adjustors acting in combination maintain the vehicle body level constant, and the air springs serve as shock absorbers.

However, a problem remains in that there is a time delay in the system between sensing of a tilt condition of the vehicle body and compensation by the system. This problem is most evident in cases in which the vehicle undergoes radical acceleration or deceleration or makes a sharp turn at relatively high speed. If the vehicle undergoes, for example, sudden deceleration from high speed, the vehicle body will be pitched forward with the vehicle body rear end level being higher than that of the front end from ground. The opposite occurs during acceleration.

In the case of the vehicle making sharp turns in alternating directions when driven on a meandering road, during each turn the vehicle body without the provision of the leveling system will roll away from the turn with the side of the vehicle body closest to the center of the turn and tilted higher than the side farthest from the center of the turn. The leveling system compensates for this by supplying fluid under pressure into the adjustors on the side of the vehicle body farthest from the center of the turn to raise that side, and drains fluid from the adjustors on the side of the vehicle body closest to the center of the turn to lower the same to restore parallelism between the vehicle body and the road surface. However, due to the delay in system operation, compensation will occur after the vehicle has started the turn and will continue for a period after the vehicle has finished the turn, resulting in an unnatural and unpleasant sensation for the vehicle occupants. In the worst possible case, the system can be extremely dangerous if the delay in the system is equal to the rate at which the vehicle is making alternating turns. In this case, compensation for a turn in one direction will occur while the vehicle is making another turn in the opposite direction, with the result that the inclination of the vehicle during the second turn is twice what it would be without the leveling system. The inclination would progressively increase so that during the following turn it would be four times that without the provision of the leveling system. As a result, a side of the vehicle body could eventually strike the road surface, and could cause a serious accident.

It is therefore an important object of the present invention to provide a fluid operated leveling system of a vehicle body including means to ensure the safety of the vehicle occupants by limiting the compensation of the leveling system.

It is a further object of the present invention to provide a fluid operated leveling system of a vehicle body which minimizes the effects of time delay in the leveling system.

It is a still further object of the present invention to provide a novel and useful fluid operated leveling system for a vehicle body which is simple in construction, inexpensive to manufacture, and can be easily mounted on a variety of motor vehicles with practically no modification to the motor vehicle designs.

The above and other objects, features and advantages of the present invention will become more apparent from the following detailed description taken in conjunction with the accompanying drawings, in which.

Figure 1:
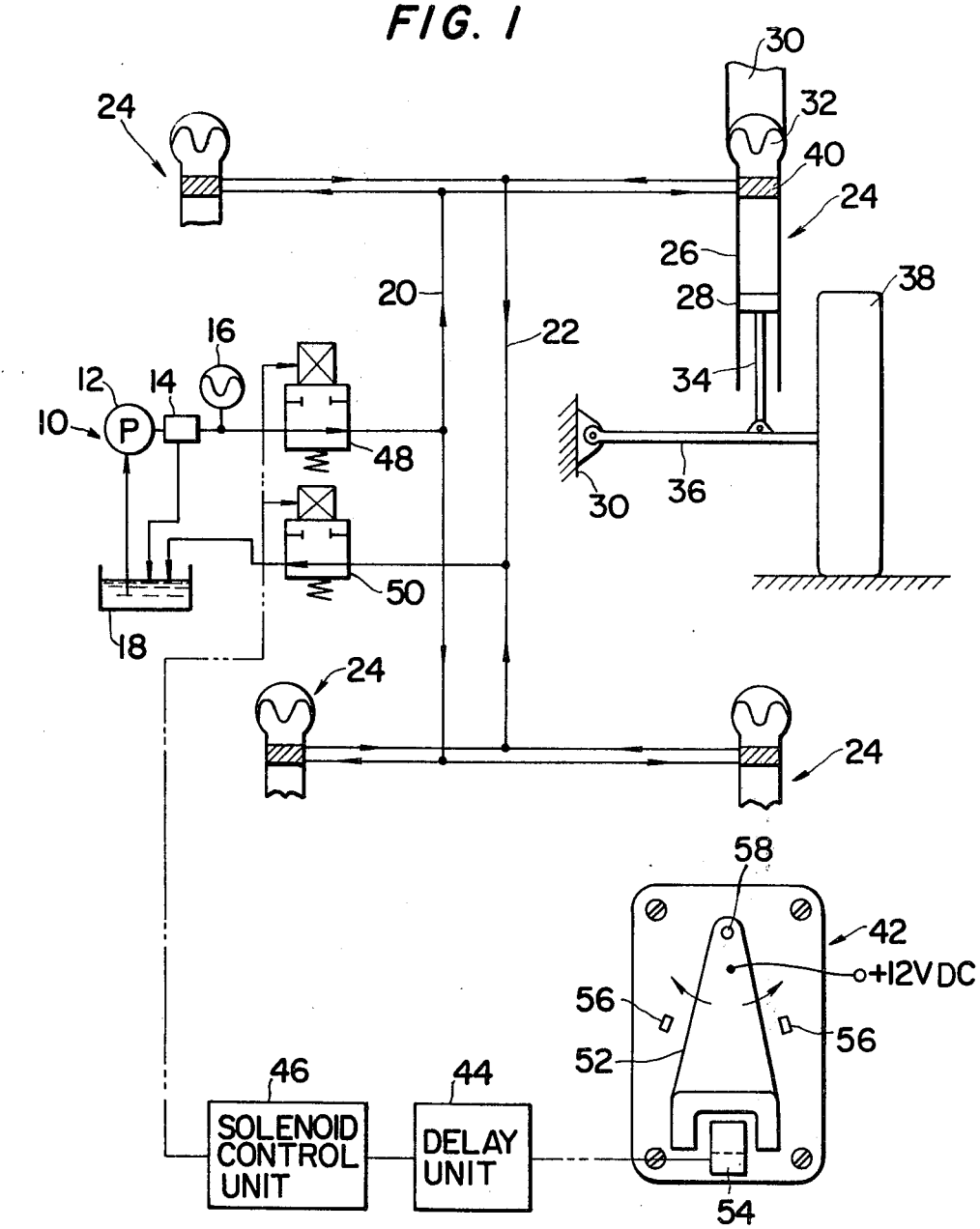
FIG. 1 is a schematic diagram of a leveling system of a motor vehicle body embodying the present invention.

Referring now to FIG. 1, a leveling system of a vehicle body embodying the present invention includes a source 10 of hydraulic fluid under pressure having a pump 12, a pressure control or bypass valve 14, and an accumulator 16. The pump 12 receives fluid from a reservoir 18, with which the bypass valve 14 also communicates. The source 10 and reservoir 18 communicate through a pressure line 20 and a drain line 22 respectively with four adjustors 24, one for each wheel of the vehicle in this embodiment. Each adjustor 24 includes a hydraulic cylinder 26 in which a piston 28 is slidable. The cylinder 28 is attached to a structural member of a vehicle body 30 through an air spring 32 which acts as a shock absorber. A piston rod 34 extends from the piston 28 and is pivotally connected to an axle 36 carried by a wheel 38. Each adjustor 24 also includes a leveling valve 40 to control communication between the interior of the cylinder 26 and the pressure and drain lines 20 and 22 respectively. Each leveling valve 40 is responsive to the inclination of the vehicle body 30 relative to the road surface or the plane substantially defined by the wheels 38, and connects the interior of the respective cylinder 26 to the pressure line 20 or the drain line 22 to raise or lower the respective portion of the vehicle body 30 as required to restore parallelism between the vehicle body 30 and the road surface.

Figure 3:
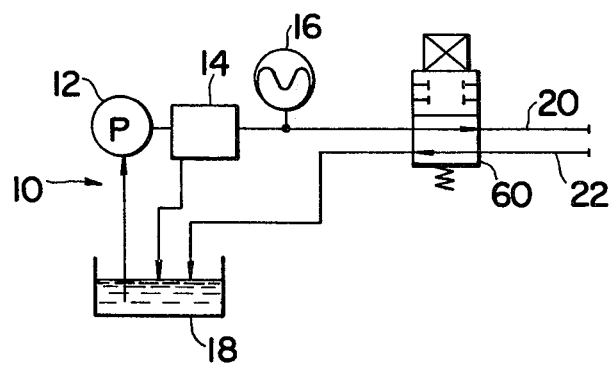
FIG. 3 is a schematic diagram showing a modification of the solenoid valve arrangement shown in FIG. 1.

The improvement of the present invention includes a sensor 42, which is mounted on the vehicle body 30 in a vertical position and is operative to sense the roll and/or pitch of the vehicle body 30 and to feed an electrical tilt signal to a delay unit 44 when the sensed level of the roll and/or pitch is above a predetermined level or in response to a sensed lack of parallelism between the vehicle body and the road surface exceeding a predetermined degree. The exemplary sensor 42 shown is a pendulum switch having an arm contact or pendulum 52 connected to an electrical power source such as a 12 V DC car battery (not shown), and a fixed contact 54 connected to the delay unit 44. The pendulum 52 engages the contact 54 when the car body 30 is tilted beyond a predetermined angle in either direction, and stops 56 are provided to limit the relative movement of the car body 30 and the pendulum 52. The electrical tilt signal is generated upon engagement of the pendulum 52 with the contact 54. This signal is fed to the delay circuit 44. After a suitable delay period, an electrical signal is generated by a solenoid control unit 46 responsive to the output of the delay circuit 44 and fed to a pressure line solenoid valve 48 and a drain line solenoid valve 50 controlling communications through the pressure and drain lines 20 and 22 between the source 10 and the reservoir 18 respectively and the adjustors 40. The solenoid valves 48 and 50 are normally open, but close in response to the electrical signal to impart a fluid lock on the adjustors 40. If desired, the two solenoid valves 48 and 50 can be provided as a single integral solenoid valve 60, as shown in FIG. 3.

It will be understood that the sensor 42 as shown is capable of sensing only the roll or the pitch of the vehicle body 30. However, two orthogonally arranged sensors 42 electrically connected in parallel can detect roll and/or pitch greater than predetermined degrees. Alternatively, any other known sensor may be employed in place of the shown sensor 42 which may sense the yaw of the vehicle body 30.

Figure 2:
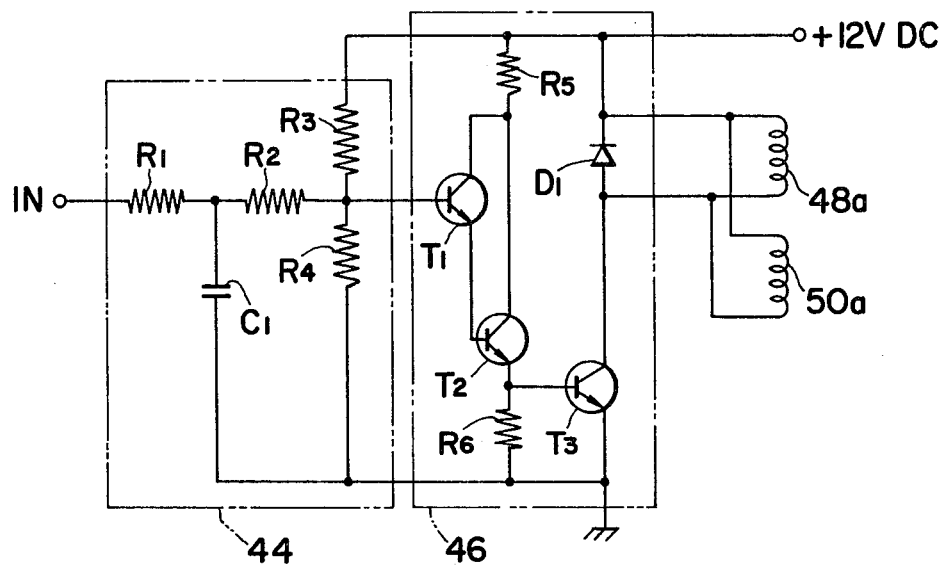
FIG. 2 is an electrical schematic diagram of a delay unit and a solenoid control unit shown in FIG. 1.

FIG. 2 shows the delay unit 44, the solenoid control unit 46 and the coils 48a and 50a of the solenoid valves 48 and 50. The delay unit 44 comprises a resistor $R_1$ having one end connected to an input terminal In leading to the sensor 42 and the other end connected to ground through a capacitor $C_1$. The junction between the resistor $R_1$ and the capacitor $C_1$ also leads to ground through resistors $R_2$ and $R_4$. The solenoid control unit 46 comprises a transistor $T_1$ connected at its base to the junction between the resistors $R_2$ and $R_4$. The base of the transistor $T_1$ is also connected through the $R_2$–$R_4$ junction and through a resistor $R_3$ to the 12V DC battery. The collector of the transistor $T_1$ is connected to the 12V DC battery through a resistor $R_5$, and its emitter is connected to the base of a transistor $T_2$. The collector of the transistor $T_2$ is connected to the 12V DC battery through the resistor $R_5$, and its emitter is connected to ground through a resistor $R_6$. The emitter of the transistor $T_2$ is also connected to the base of a transistor $T_3$. The collector of the transistor $T_3$ is connected to the 12V DC battery through a diode $D_1$, and its emitter is connected directly to ground. The coils 48a and 50a of the solenoid valves 48 and 50 are connected in parallel across the diode $D_1$.

The resistors $R_3$ and $R_4$ act as a voltage divider to bias the base of the transistor $T_1$ to a suitable voltage in the cutoff region. The resistor $R_1$ and capacitor $C_1$ constitute an integrating circuit to integrate the electrical tilt signal from the sensor 42 with respect to a function of time. The transistor $T_1$ and associated components act as a level detector to switch on the transistor $T_3$, which acts as a power transistor, when the integrated level of the electrical tilt signal exceeds the cutoff voltage of the transistor $T_1$.

Figure 4A:
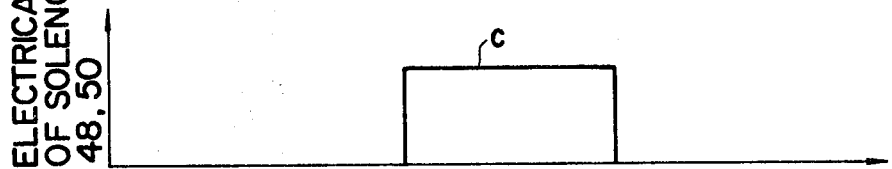
FIGS. 4A, 4B, 4C, are timing charts illustrating the relationship between electrical signals produced within the system of FIG. 1 and time.
Figure 4B:
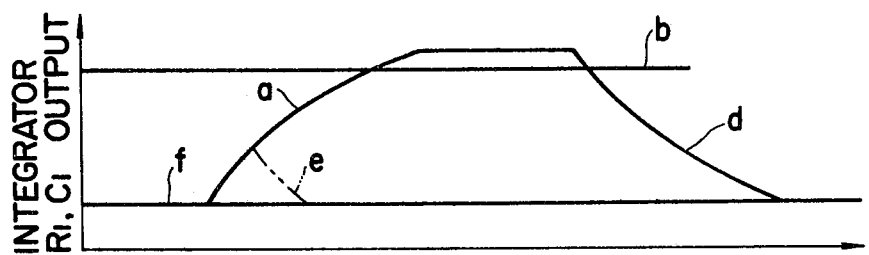

The operation of the system will now be described with reference also to FIG. 4. During normal operation, the pendulum 52 and contact 54 are not engaged and the electrical tilt signal is not generated by the sensor 42. The integrating circuit comprising the resistor $R_1$ and the capacitor $C_1$ of the delay circuit 44 does not produce a voltage output, and the transistor $T_1$ of the solenoid control unit 46 is biased and cutoff as shown by a line f in FIG. 4b. The transistor $T_3$ of the solenoid control unit 46 is thereby turned off, and no electrical signal is fed to the solenoid coils 48a and 50a. The solenoid valves 48 and 50 are thus open, and the level of the vehicle body 30 is controlled by means of the leveling valves 40 of the adjustors 24.

Figure 4C:
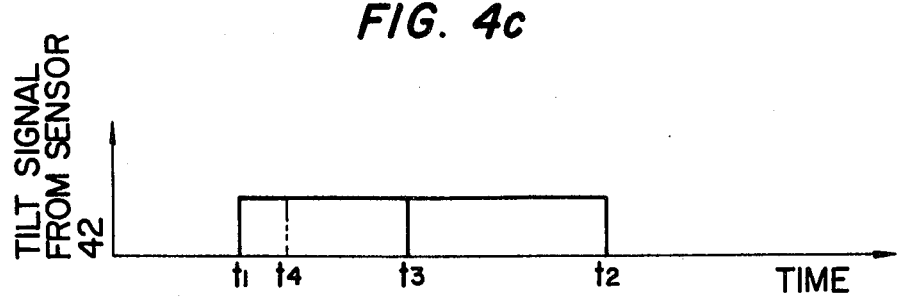

If, however, at a time $t_1$, the roll and/or pitch of the vehicle body 30 should exceed the predetermined values, the pendulum 52 and contact 54 of the sensor 42 will engage and the terminal In of the delay circuit 44 will be connected to the 12V DC battery therethrough as shown in FIG. 4c. The capacitor $C_1$ will then begin to charge through the resistor $R_1$ as shown by a curve a in FIG. 4b. When the voltage across the capacitor $C_1$, or the integral of the electrical tilt signal with respect to a function of time reaches the cutoff point of the transistor $T_1$ represented by a line b at a time $t_3$, the transistor $T_1$ and thereby the transistor $T_3$ will conduct, with the result that the electrical signal will be fed to the coils 48a and 50a of the solenoid valves 48 and 50 as represented by a curve c in FIG. 4a. The solenoid valves 48 and 50 then close, and lock the adjustors 24 so that delayed and erroneous compensation by the leveling system of the tilt of the vehicle body 30 is prevented. At a time $t_2$, when the tilt of the vehicle body 30 is reduced below the predetermined value, the pendulum 52 and contact 54 disengage, and generation of the electrical tilt signal is terminated as shown in FIG. 4c. The capacitor $C_1$ of the delay circuit then starts to discharge through the resistor $R_4$, and when the voltage across the capacitor $C_1$ drops below the cutoff level b of the transistor $T_1$, the transistor $T_1$ will be rendered non-conductive as will the transistor $T_3$, and generation of the electrical signal will be terminated as shown in FIG. 4a. The solenoid valves 48 and 50 will then open, and the leveling system will operate normally.

The delay circuit 44 serves to prevent erroneous operation of the leveling system by inhibiting closure of the solenoid valves 48 and 50 unless excessive roll and/or pitch condition has persisted beyond a predetermined length of time corresponding to the time constants of the resistor $R_1$ and capacitor $C_1$. This condition is shown in FIG. 4. If the sensor 24 starts generating the electrical tilt signal at the time $t_1$ but stops generating it at a time $t_4$, the capacitor $C_1$ will not have sufficient time to charge up to the cutoff level b of the transistor $T_1$ and will start discharging at the time $t_4$ as shown by a curve e. The solenoid valves 48 and 50 will thereby not be closed, and erroneous operation of the leveling system will be prevented.

From the above description, the safety and other features of the invention should be readily apparent.

What is claimed is:

1. In a fluid operated levelling system of a vehicle body having a source of fluid under pressure connected to a fluid reservoir, the combination comprising:
   adjustors operative to raise and lower the vehicle body relative to ground;
   levelling valves communicating with the source and the reservoir and being responsive to the tilt of the vehicle body with respect to road surface and operative to communicate the adjustors with the source and the reservoir to move the vehicle body to a level substantially parallel to the road surface;
   first electrically controlled normally open valve means connected between the source and inlets of the levelling valves;

second electrically controlled normally open valve means connected between the reservoir and outlets of the levelling valves;

sensing means for sensing the tilt of the vehicle body relative to road surface and generating an electrical tilt representing signal in response to said sensed tilt;

a delay unit connected to the sensing means and including integrating means for integrating said electrical tilt representing signal with respect to time; and a solenoid control unit connected between the delay unit and the first and second valve means, said solenoid control unit including a level detector responsive to the output of the delay unit and operative to feed said electrical tilt representing signal to the electrically controlled valve means when the integrated level of said electrical tilt representing signal is above a predetermined value for thereby closing said electrically controlled valve means to block fluid communication between the source and the reservoir and the levelling valves.

2. The combination according to claim 1, in which said sensing means is responsive to at least one of the roll and pitch of the vehicle body.

3. The combination according to claim 1, in which said first and second electrically controlled normally open valve means comprise first and second solenoid valves.

4. The combination according to claim 1, in which said sensing means includes a pendulum switch having one contact fixed to the vehicle body and another contact in the form of a pendulum engageable with said one contact when the lack of parallelism between the vehicle body and a horizontal road surface exceeds a predetermined degree.

5. The combination according to claim 1, in which the fluid is in liquid form, and in which the source includes a pump, a pressure control valve and an accumulator.

6. The combination according to claim 3, in which said first and second solenoid valves are integral.

* * * * *